(12) United States Patent
Whitlock et al.

(10) Patent No.: US 7,487,189 B2
(45) Date of Patent: Feb. 3, 2009

(54) EXTENSIBLE REMOTE DATA SYNCHRONIZATION

(75) Inventors: Donna Whitlock, Seattle, WA (US); Anthony J. Yeates, Redmond, WA (US); Pavel Dournov, Redmond, WA (US); Eric Hawthorne, Woodinville, WA (US); Sylvester La Blanc, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 10/742,463

(22) Filed: Dec. 19, 2003

(65) Prior Publication Data

US 2005/0137895 A1 Jun. 23, 2005

(51) Int. Cl.
*G06F 17/30* (2006.01)
(52) U.S. Cl. .................. 707/203; 707/200; 707/204
(58) Field of Classification Search ......... 707/201–204, 707/10; 714/12; 713/375, 400
See application file for complete search history.

(56) References Cited

U.S. PATENT DOCUMENTS

| 5,870,759 | A * | 2/1999 | Bauer et al. ............... 707/201 |
| 6,330,709 | B1 * | 12/2001 | Johnson et al. ............ 717/100 |
| 6,442,566 | B1 * | 8/2002 | Atman et al. ........... 707/103 R |
| 2004/0015503 | A1 * | 1/2004 | Smith et al. ............... 707/100 |
| 2004/0049693 | A1 * | 3/2004 | Douglas .................... 713/200 |
| 2004/0128644 | A1 * | 7/2004 | Hurst et al. ................ 717/100 |

OTHER PUBLICATIONS

Panagos et al, "Sychronization and recovery in a client-server storage system", May 1996, AT &T Research, p. 209-223.*
Stephan et al, "Flexible Synchronization of Shared Groupware Objects", Dec. 1999, Siggroup Bulletin, vol. 20 No. 3, p. 14-17.*
"HAHT Commerce Passes Beta Testing for UCCnet XML Schema Hardlines Specification; New Standard Lays the Foundation for Global Data Synchronization Network," http://www.businesswire.com/webbox/bw.101303/232865273.htm, pp. Oct. 13, 2003.
"Driving Value in the CPG/Retail Industry Through Data Synchronization: The Basis for Trading Partner Collaboration," IBM Business Consulting Services, www.ibm.com/bcs, 2003.
"webMethods Integration: Item Synchronization in the Consumer Goods Industry," WebMethods, 2003.

* cited by examiner

*Primary Examiner*—Cam-Linh Nguyen
(74) *Attorney, Agent, or Firm*—Christopher R. Christenson; Westman, Champlin & Kelly, P.A.

(57) ABSTRACT

Data replication between a headquarters application and one or more client applications is provided. The client applications are generally located remote from the headquarters application and communicate therewith via known methods. A pair of classes is used to generically transfer data selected for replication. New entity types and/or data types can be synchronized without having to rewrite the synchronization application by simply deploying an appropriate data class and manager class for the new entity. Moreover, the prior art worksheet is abstracted, in some aspects, to a simpler form that is more user friendly.

27 Claims, 5 Drawing Sheets

EXTENSIBLE REMOTE DATA SYNCHRONIZATION

FIELD OF THE INVENTION

The present invention relates to data synchronization between two remote locations. More particularly, the present invention relates to data synchronization in a retail management system between a headquarters module and one or more store modules.

BACKGROUND OF THE INVENTION

Retailers like Wal-Mart, The Home Depot and Target invest heavily in strategies and technologies that help them sell more, grow rapidly, and cut operating expenses. Their success demonstrates that operational efficiency dictates survival, and that access to retail information impacts growth and profitability.

As a result of changes in the retail industry including intensified competition, retailers now desire immediate access to ever changing information. They desire the ability to instantly act on that information, either selectively by store, region, or globally. There is a desire for store-based information that is easily and flexibly reportable, and for management capability that enables decisions to be easily entered, implemented, and enforced.

Information technology infrastructure should tell management what was bought, when, where, by whom and why. Retailers should be able to determine the impact of promotions and markdowns, buying trends, and dynamic consumer demographics/life styles. There should be support for strategic decisions to be made centrally and implemented chain-wide or at individual stores. Retailers and suppliers should be able to work together to distribute the right merchandise mix in a timely, efficient manner.

Accordingly, retailers have struggled for years to set up information systems that integrate and connect headquarters, in-store processors and point-of-sale systems. Lack of a comprehensive solution forced chains to piece together closed proprietary systems often based on disparate data models and data access techniques. The cost and complexity—and lack of certainty—in deploying such piece work solutions have slowed the growth of small and medium-sized chains.

One example of a response to the needs of small to mid-size stores/chains is the Microsoft Retail Management System (MRMS) available from Microsoft Corporation of Redmond, Wash. The MRMS package is designed to support the growing number of small to mid-size stores/chains looking for software to grow as they grow and address immediate and future business goals. As an integrated, business-wide, point-of-sale and retail management solution, the MRMS software allows mid-size retail chains to take advantage of price and technical innovations in commodity hardware, software and internet-enabling technologies. The system enables small and mid-size retail chains to exploit the same technologies that reveal the most salable mixes of merchandise and shave dollars off of big chain store prices and/or reduce the time and cost dedicated to the business. The MRMS package offers a number of components that enable users to successfully manage multi-store operations. These components include a store operations module, a headquarters (HQ) remote client, HQ communications server programs, and HQ manager program.

With MRMS, store operations software operates at each store in the retail enterprise and maintains sales data in a local database. Each store generally includes a manager application for back-office operations (inventory, pricing, tracking, customers and suppliers, managing user accounts, register configuration, hardware set-up, et cetera). Key information obtained in the store operations database is regularly uploaded to the head office. At the same time, management changes made at the head office are downloaded to each store's database.

With MRMS, the HQ remote client and HQ communication server programs are part of the store operations HQ software package. HQ client is installed at each remote store and automatically, or manually with user interaction, initiates a connection to the head office based on a schedule specified by the head office. The connection can generally be made via the internet or over virtual private network (VPN). Once connected, the HQ client receives instructions to upload sales and inventory data or other information requested by HQ. It also updates the store's database to reflect any changes made at HQ that need to be propagated to the store.

The HQ communication server is installed on a machine at the head office and is responsible for exchanging data between the HQ database and remote stores. The HQ communications server sends HQ clients worksheets that need to be processed by the stores. One such worksheet is a request that one or more stores upload particular data specified by the worksheet.

At the head office, the HQ manager program provides the user interface and management of retail information in the HQ database. Functions necessary to manage a retail chain are provided. HQ Manager is sometimes used for integration to other enterprise-level applications, such as financials and Business Intelligence. HQ manager lets users create new inventory items or update the data (items, suppliers, prices, costs, et cetera) that keep the user's retail chain running smoothly. HQ manager enables the user to set policies and procedures for each store to follow, then enforces those rules throughout the enterprise. Specially tailored, multi-level reports let the user sort and combine business data—even drilling down to modify the database directly from the reports.

With MRMS, HQ employs known "worksheets" to implement management changes. The user employs a number of different HQ worksheets to plan and execute changes to the HQ database and remote store databases. Worksheets initiate and control data exchanges between the head office and stores. Through worksheets, the head office can command any store, group of stores, or all stores to perform specific tasks that affect the local database, and then to report back processing status. Each worksheet contains built-in mechanisms to help the user properly plan desired changes, obtain approval for changes and track actual changes for other purposes.

While retail management systems have proven to be useful for retailers, some limitations to these systems exist. Some current retail management systems generally require a user to specify the data to be exchanged and the timing of data exchange. In some cases, this is accomplished through the selection and generation of worksheets. Moreover, some systems also generally require an update to the application that performs the data exchange each time that a new type of data needs to be exchanged. Accordingly, the prior art has generally not provided a system that is particularly extensible. If a retail management system could be provided that included data synchronization between a headquarters application and store operations, which was extensible, while not requiring unnecessary user interaction, an enhanced user experience would result.

SUMMARY OF THE INVENTION

Data replication between a headquarters application and one or more client applications is provided. The client applications are generally located remote from the headquarters application and communicate therewith via known methods. A pair of classes is used to generically transfer data selected for replication. New entity types and/or data types can be synchronized without having to rewrite the synchronization application by simply deploying an appropriate data class and manager class for the new entity. Moreover, the prior art worksheet is abstracted, in some aspects, to a simpler form that is more user friendly.

DETAILED DESCRIPTION OF ILLUSTRATIVE EMBODIMENTS

The present invention involves a communication protocol between retail entities. However, prior to describing the present invention in greater detail, one exemplary computing environment in which the present invention can exist is described.

Figure 1:
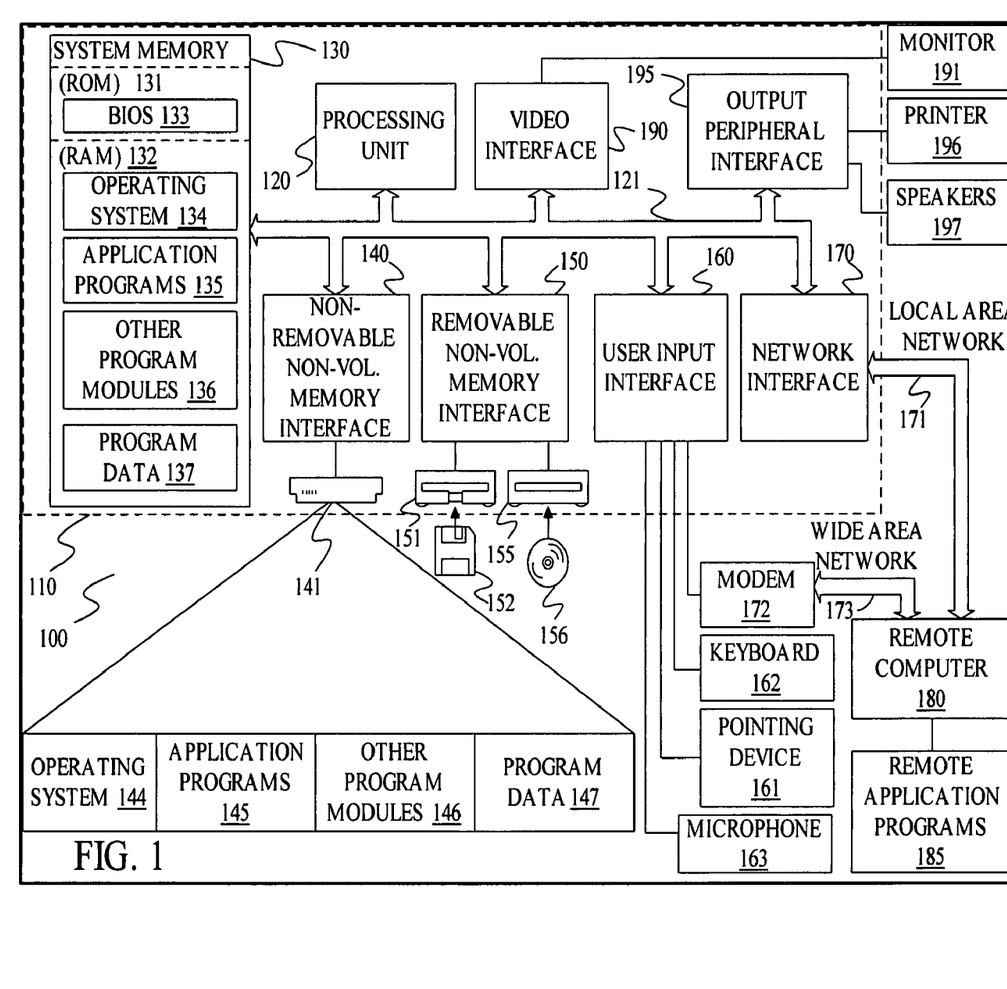
FIG. 1 illustrates an example of a suitable computing system environment 100 on which the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, retail POS systems, tabletPCs, PocketPCs, wearable computers, smartphones, kiosks, self-checkout POS systems, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF (such as Bluetooth), infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape,. solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Additional peripherals, which may be used, include magnetic stripe readers, signature capture devices, touch screens, smartcard readers, scanners, scales, biometric devices (fingerprint scanners, eye scanners, et cetera), magnetic ink check readers, payment terminals, Rfid tag readers, security cameras, cash draws, receipt printers, column displays, pin-pads, et cetera.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other— means of establishing a communications link between the computers may be used.

Aspects of the present invention generally leverage a rich, programmatically descriptive environment such as Microsoft's .Net family of related technologies to enhance and extend the functionality of store operations/HQ communication. Although embodiments will be described with respect to .Net and metadata reflection, variations can be used as long as a sufficiently complete programmatic description of the improved worksheet objects can be created and deployed.

Figure 2:
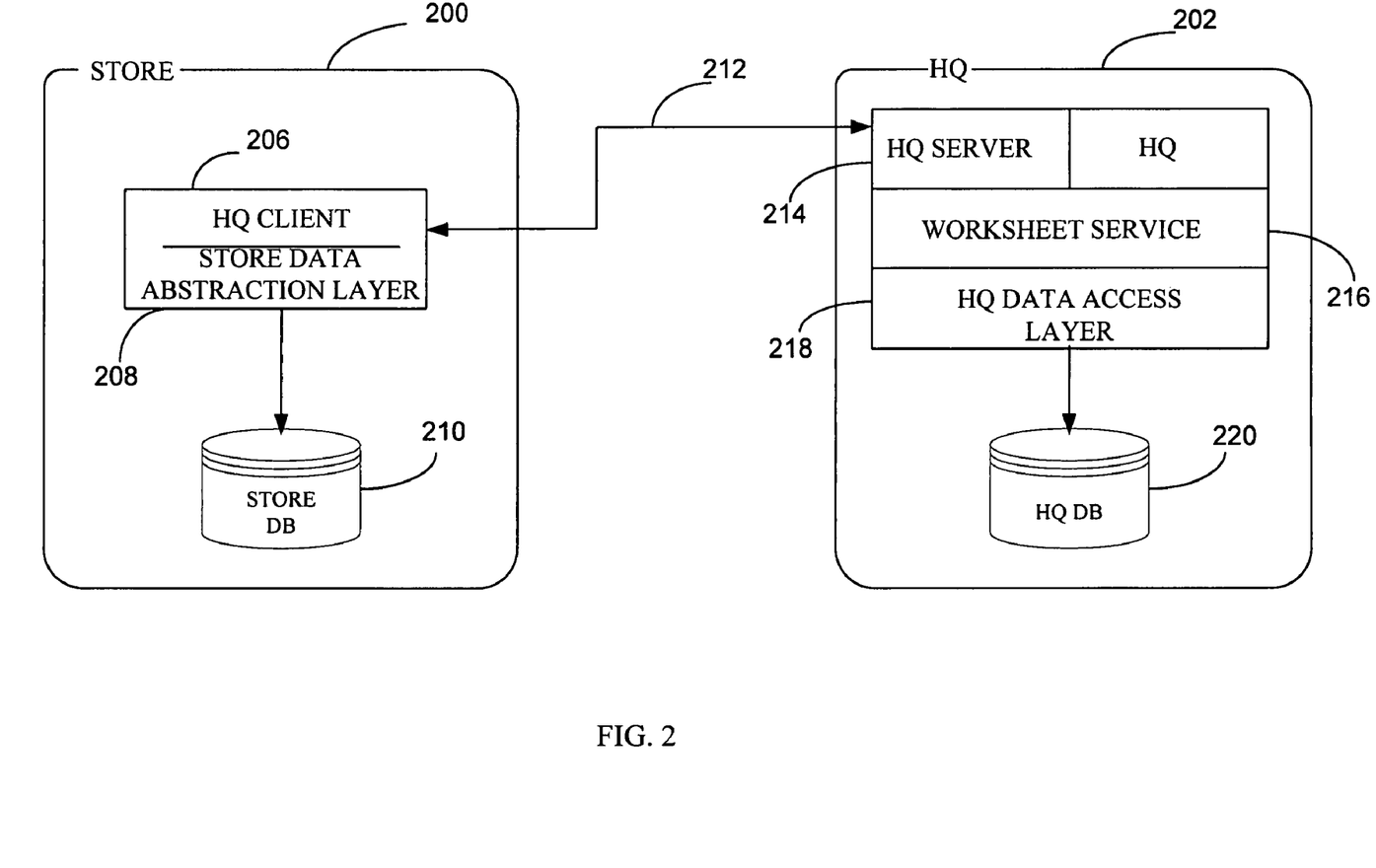
FIG. 2 is a diagrammatic view of a store operations product operating with an HQ product in accordance with an embodiment of the present invention.

FIG. 2 is a diagrammatic view of a store operations environment operating with an HQ product in accordance with an embodiment of the present invention. For clarity, FIG. 2 illustrates a single store product operating with an HQ product, when in reality, a significant number of stores may interact with the HQ product. Each of store product 200 and HQ product 202 operate using a computing environment as described with respect to FIG. 1. In order to facilitate adoption of products incorporating embodiments of the present invention, it is important that such embodiments easily allow all worksheet functions provided by the prior art. Accordingly, the following entities would preferably be created, edited or deleted at HQ product 202: Item Messages; Customers; AccountsReceivable; AccountsReceivableHistory; QuantityDiscounts; Sales Tax; Departments; Categories; Tender Types; Shipping Carriers; Shipping Services; Schedules; Store; Reason Codes; Suppliers; Items and Inventory. The following entities would be created, updated or deleted using store product 200: Journal Entries; Cashier; Customer; Item; Inventory Transfers; Orders; Register; and SalesRep. Transfer of data for the above entities is essentially reduced to automatic data replication using embodiments of the present invention. However, user-initiated worksheets could still be provided for the Sync Store Database worksheet and the execute SQL Statement worksheet. While it may be useful to conceptualize business data change orders as 'worksheets', such worksheets are generated automatically by the retail management system in accordance with embodiments of the present invention.

Store product 200, illustrated in FIG. 2, includes HQ client application 206, store data access layer (DAL) 208 and store database 210. HQ client 206 is preferably a Windows® service running at the store. While embodiments of the present invention are described herein with respect to Windows® and Windows® technologies, such exemplary description is provided in order to an enhance clarity. Embodiments of the present invention can utilize the concepts described herein with other technologies. For example, while .NET is provided as the environment for managed code, such a managed code environment may be developed for such platforms as UNIX/LINUX/ and MacOS. Thus, HQ client 206 could be one or more cronjobs or server processes on UNIX or LINUX. HQ client 206 interacts with store Data Abstraction Layer 208 to generate changes in store database 210 as required by product 202. Store DAL 208 is a data abstraction layer that is preferably implemented as a collection of .NET assemblies that provides an interface between RMS applications and store database 210. Client 206 provides information over communication link 212 in order to ensure that specified information is replicated at HQ. Link 212 can include any communication methods that are currently used with the store/HQ products. Additionally, link 212 can be implemented using .NET remoting over a TCP/IP channel. Preferably, however, link 212 is implemented using web services. Embodiments that employ web services can advantageously leverage built-in security functions that web services provides. Web services also provides a convenient interface that allows implementation of the server and caller code to be revised independently of each other.

HQ product 202 includes HQ server application 214, which interacts with worksheet service 216 and HQ data access layer 218 (hereinafter DBAL 218) to generate changes in, and propagate changes from HQ database 220. HQ server 214 is also preferably a Windows® service, but could be implemented as a server process and one or more cronjobs in UNIX/LINUX. Server 214 interacts with worksheet service 216 to read and write data transferred via worksheets. Worksheet service 216 is preferably a .NET assembly that encapsulates logic for creating and processing worksheets. Worksheet service 216 makes use of HQ DBAL 218 to read and write data. HQ DBAL 218 is also preferably implemented as a .NET assembly and provides an interface between RMS applications and HQ database 220.

In order to minimize the size of objects actually transferred between HQ server 214 and HQ client 206, a pair of entities is used. The first class of entity is a simple data class or struct whose purpose is to encapsulate all data about a particular entity. The second class is a manager class that manages any database accesses and that encapsulates any knowledge a given entity needs to have about other classes in the system. The following is a purely illustrative example relative to these two cooperative classes for the existing customer class.

Customer:

---

<<property>> +get_ID( ) :Long
<<property>> +get_AccountTypeID( ) :Long
<<property>> +get_TaxNumber( ) :String
<<property>> +get_FirstName( ) :String
<<property>> +get_LastName( ) :String
<<property>> +get_Name( ) :String
<<property>> +get_EmailAddress( ) :String
<<property>> +get_HomeAddress( ) :String
<<property>> +get_ShipToAddressL( ) :String
<<property>> +get_ShipToID( ) :String
<<property>> +get_AccountsReceivablesTotalDue( ) : Currency
<<property>> +get_AccountReceivablesTotalCredit( ) : Currency
<<property>> +get_AccountReceivablesTotalPayments( ) : Currency
<<property>> +get_AccountReceivablesAppliedCredits( ) : Currency
<<property>> +get_DaysOverdue( ) : Long
<<property>> +get_PurchaseLimit_TotalPoints( ) :Double
<<property>> +get_PurchaseLimit_StartDate( ) :Date
<<property>> +get_PurchaseLimit_TotalUnits( ) :Double
<<property>> +get_PurchaseLimit_Enables( ) :Boolean
<<property>> +get_Accountbalance( ) :Currency
<<property>> +get_PreviousAccountBalance( ) :Currency
<<property>> +get_AccountOpened( ) :Date
<<property>> +get_AccountNumber( ) :String -continued <<property>> +get_AccountReceivables( ) : AccountReceivables
<<property>> +get_AccountDateDueType( ) :accountdueEnum
<<property>> +get_AccountGracePeriod( ) :Integer
<<property>> +get_AccountMinimumPayment( ) :Currency
<<property>> +get_GlobalCustomer( ) :Boolean
<<property>> +get_LastVisit( ) :Date
<<property>> +get_Totalvisits( ) :Long
<<property>> +get_TotalSales( ) :Currency
<<property>> +get_TotalSavings( ) :Currency
<<property>> +get_LastClosingDate( ) :Date
<<property>> +get_PriceLevel( ) :Integer
<<property>> +get_CreditLimit( ) :Currency
<<property>> +get_CurrentDiscount( ) :Single
<<property>> +get_TaxEmempt( ) :Boolean
<<property>> +get_HasChargeAccount( ) :Boolean
<<property>> +get_Employee( ) :Boolean
<<property>> +get_AssessFinanceCharges( ) :Boolean
<<property>> +get_Notes( ) :String
<<property>> +get_CustomText1( ) :String
<<property>> +get_CustomText2( ) :String
<<property>> +get_CustomText3( )String
<<property>> +get_CustomText4( ) :String
<<property>> +get_CustomText5( ) :String
<<property>> +get_CustomNumber1( ) :Double
<<property>> +get_CustomNumber2( ) :Double
<<property>> +get_CustomNumber3( ) :Double
<<property>> +get_CustomNumber4( ) :Double
<<property>> +get_CustomNumber5( ) :Double
<<property>> +get_CustomDate1( ) :Date
<<property>> +get_CustomDate2( ) :Date
<<property>> +get_CustomDate3( ) :Date
<<property>> +get_CustomDate4( ) :Date
<<property>> +get_CustomDate5( ) :Date
<<property>> +get_CustomCaptionText1( ) :String
<<property>> +get_CustomCaptionText2( ) :String
<<property>> +get_CustomCaptionText3( ) :String
<<property>> +get_CustomCaptionText4( ) :String
<<property>> +get_CustomCaptionText5( ) :String
<<property>> +get_CustomCaptionDate1( ) :Date
<<property>> +get_CustomCaptionDate2( ) :Date
<<property>> +get_CustomCaptionDate3( ) :Date
<<property>> +get_CustomCaptionDate4( ) :Date
<<property>> +get_CustomCaptionDate5( ) :Date
<<property>> +get_CustomCaptionNumber1( ) :String
<<property>> +get_CustomCaptionNumber2( ) :String
<<property>> +get_CustomCaptionNumber3( ) :String
<<property>> +get_CustomCaptionNumber4( ) :String
<<property>> +get_CustomCaptionNumber5( ) :String
<<property>> +get_PrimaryShipToID( ) :Long
<<property>> +get_CashierID( ) :Long
<<property>> +get_SalesRepID( ) :Long
<<property>> +get_Loaded( ) :Boolean
<<property>> #Get_ItemTax( ) :Boolean

---

CustomerManager:

---

-m_Parent:Transaction
Create(in Parent:Transaction)
Destroy( )
<<property>> +get_Session( ) :SessionClass
+ListPurchases( ) :Recordset
+AdjustCredit(in Delta:Currency)
Load(in CustomerID:Long)
-DetermineCustomerTax( )
+LoadShipToAddress(in ShipToID:Long) : StatusCategoryEnum
-CalculateDaysOverDue(in CurrentDate:Date)Long
-CalculatePastPurchases(in CurrentDate:Date)

---

The above classes, Customer and CustomerManager are examples of the data container and manager classes for the customer class. Adding additional classes is as simple as providing the appropriate data container class and manager class.

Embodiments of the present invention also generally employ worksheet classes. This is preferably in the form of a Worksheet class and a WorksheetManager class. The WorksheetManager class is provided to handle worksheet-related data access. An illustrative WorksheetManager Class may take the following form:
WorkSheetManager

```
+Create(in worksheet:Worksheet)
+Read(in ID:int) :Worksheet
+Update(in ID:int)
+Delete(in ID:int)
+GetWorksheets(in storeID:int,
          status:WorksheetStatusEnum)
+GetWorksheets(in type:WorksheetTypeEnum,
          in status:WorksheetStatusEnum)
          :System.Collections.Array
```

The base Worksheet class contains worksheet summary data along with several methods that can be overridden as necessary to implement worksheet functionality. An exemplary Worksheet class is as follows:
Worksheet
−ID:int
−Type:WorksheetTypeEnum
−Status:WorksheetStatusEnum
−Title:string
−Notes:string
−EffectiveDate:
−FromDate
+LoadData( )
+SaveData( )
+Process( )

Each worksheet is implemented as a class derived from the Worksheet class. Worksheets which required additional data to be saved at the time when they were created would override SaveData( ) which would be called by the WorksheetManager's Create( ) method. These worksheets would override Delete( ) to clean up additional data saved by the worksheet. All worksheets would override LoadData( ) in order to populate themselves with worksheet-specific data. This method will be called from the WorksheetManager's Read( ) method. All worksheets would also override Process( ), which would use the HQ/Store data access layer classes to update the HQ/Store database with the data contained in the individual worksheet.

Figure 3:
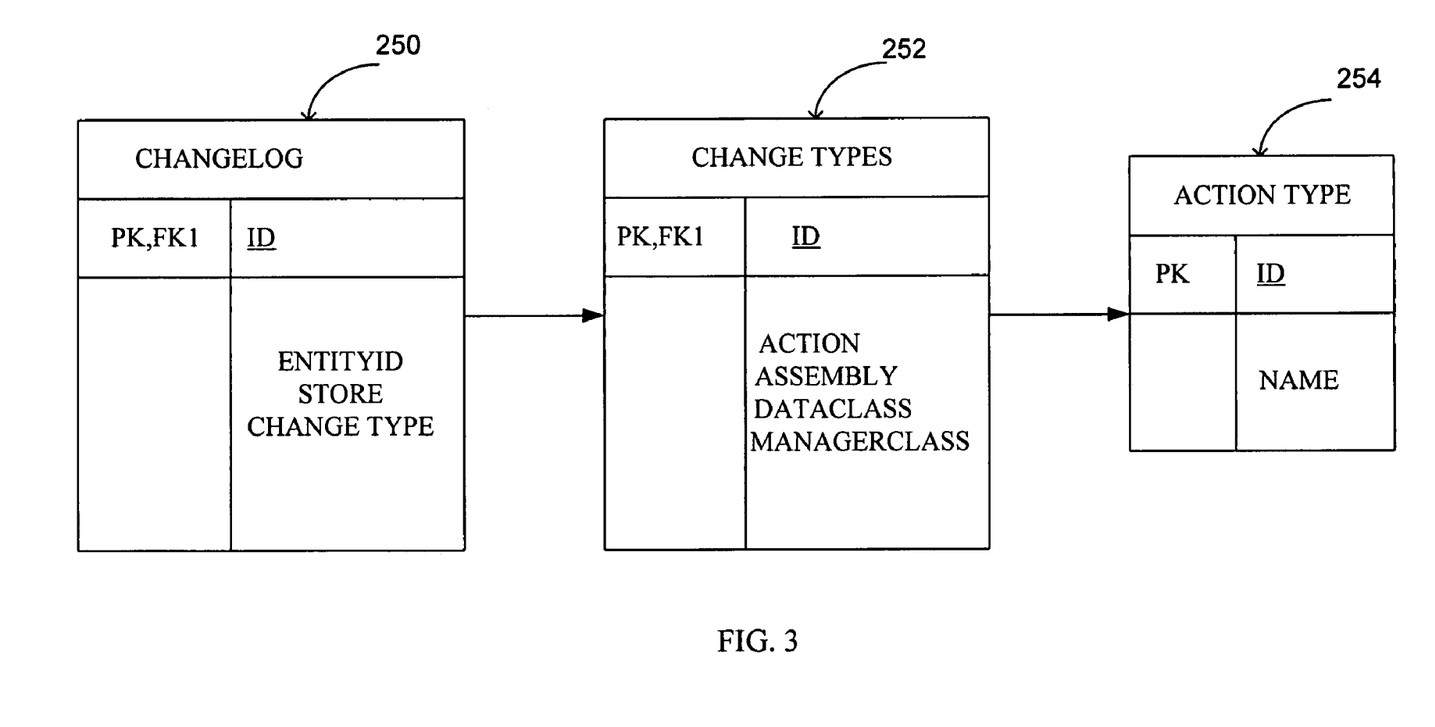
FIG. 3 is a diagrammatic view of a table structure useful for implementing embodiments of the present invention.

FIG. 3 is a diagrammatic view of a table structure that is useful for implementing embodiments of the present invention. ChangeLog table 250 is added at both HQ and each store to track changes at HQ that need to be replicated and vice-versa. The specification of which data is to be replicated can be done in any manner, but is preferably effected via a user-interface such as that described with respect to FIG. 4. When data is selected for replication, changes to the selected data will be tracked in the ChangeLog table 250. Preferably, a row for each store for which the replication is required is added automatically when selected data changes. One way that this automatic behavior can be achieved is by using database triggers on the entities for which replication is desired. Another way is to add entries periodically based upon a query (for example by an SQL job) for updated records. For example, software triggers can be added on insert/update/delete of the entities for which replication is desired.

ChangeLog table 250 preferably includes rows containing the following information.

Entity ID—This is a unique ID of the entity to be replicated (for example, ID from the Customer table of a new customer that has been added).

Store—A row is entered in ChangeLog table 250 for each store. This is used to track whether a change should be replicated to a particular store.

ChangeType—This is an identification from the ChangeTypes table 252 reflecting the type of change. ChangeTypes table 252 preferably includes the following information relative to changes.

Action—This is a foreign key identifying the type of change from ActionType table 254. This is generally one of Add, Delete, and Update.

Assembly—The assembly name that implements the data class and manager class from the data access layer. The code for replicating the changes preferably uses reflection to consume metadata relative to the data class and manager class in order to generically read data from the source, and generically write data to the target database. It is the generic nature of these operations that facilitates extensibility.

DataClass—The name of the data class that encapsulates the entity that was changed.

ManagerClass—The name of the manager class that handles persistence of the data class.

Some embodiments of the present invention generally use metadata, preferably via NET reflection, to achieve extensibility of the communications protocol between HQ and stores to any data type that might be added after the product ships. FIG. 3 illustrates the tables that can be used to track changes to data entities that are selected for replication between one or more stores and HQ. Triggers are preferably used to automatically add entries to the tables any time that a entity of interest is modified. Embodiments of the invention generally employ new object types at the store(s) and HQ. These new object types are the data object which represents the entity to be saved to the database, and the manager object which knows how to save/restore the object. Worksheet service 216 periodically checks the ChangeLog database tables where the changes are tracked, and uses reflection to instantiate the appropriate manager object, which is used to instantiate the data object. Using reflection to instantiate the appropriate manager object is one example of dynamically calling a manager class related to the changed data. Another way that this could be accomplished, for example, is by dynamically loading the manager class from the assembly named in the table. The service can transmit over any suitable link, but preferably uses web services. On the receiving end, reflection is again used to instantiate the manager object to persist the data object to the database. Using embodiments of the present invention, enabling the exchange of a new entity simply requires the implementation of the new data class and manager class for that entity rather than having to modify the services used to exchange data, as is required in the prior art.

Figure 4:
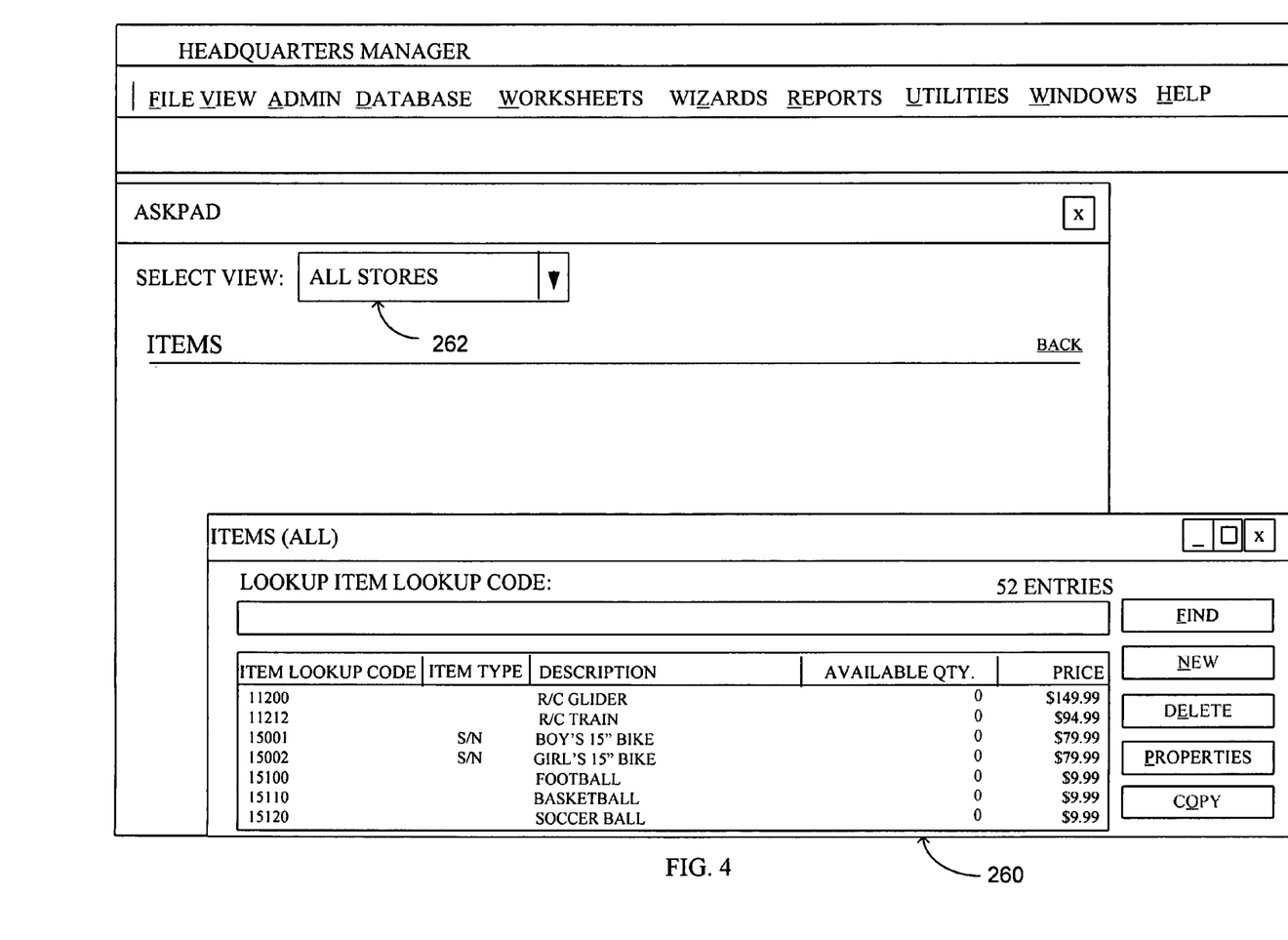
FIG. 4 is a diagrammatic view of a user interface in accordance with embodiments of the present invention.

FIG. 4 is a diagrammatic view of a user interface supported by embodiments of the present invention. User interface 260 provides a simple and effective way to support the functionality that the prior art has achieved with worksheets. In particular, interface 260 allows data viewing on a store-by-store basis. Interface 260 includes interface control 262 that allows a user to select, at an application level, the 'view' of the data that is being edited. For example, when a user selected 'All Stores' as indicated in FIG. 4, the user will be able to view the data across all stores in the organization. When a user selects a particular store, only data from that store will be edited. Users can also select groups of stores, as desired, to edit data for the groups as well.

Embodiments of the present invention simplify the data exchange between stores and HQ substantially while at the same time providing extensibility and user-friendliness. The user interface 260 allows intuitive interaction with data across the user's organization.

Figure 5:
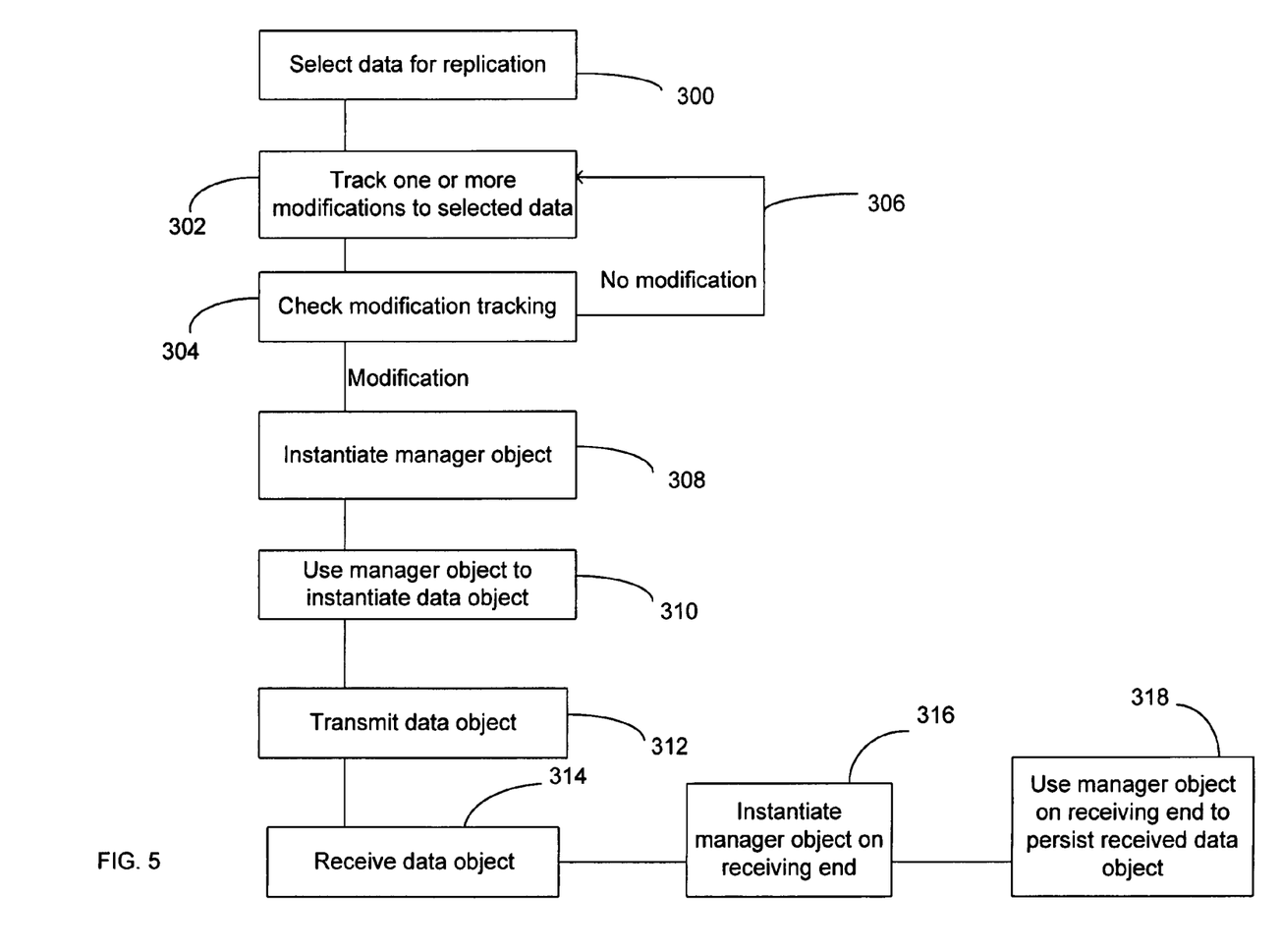
FIG. 5 is a diagrammatic view of a method for transferring data between HQ and a store in accordance with an embodiment of the present invention.

FIG. 5 is a diagrammatic view of a method for transferring data between HQ and a store in accordance with an embodiment of the present invention. The method begins at block 300 where a user selects data for replication. This can be done in any suitable manner, but is preferably effected using an intuitive user interface such as that described with respect to FIG. 4. At block 302, one or more modifications to the selected data are tracked. This tracking is preferably done using tracking tables, such as those described with respect to FIG. 3, but can be done in any suitable manner. At block 304, the tracking tables, preferably at HQ and each store, are checked to determine if any modifications to data selected for replication have occurred. If no changes have occurred, the service keeps checking periodically, at a predetermined time, or in response to a user input (such as pressing a button) as indicated at line 306. However, once a modification is detected, control passes to block 308 where the proper manager object for the changed entity is instantiated. In a preferred embodiment, this is done by examining the manager object column of the ChangeType table. However, in embodiments where manager object data is not stored in a table, such information could be stored in entity metadata, for example as a managed code attribute in the specified assembly. At block 310, the instantiated manager object is used to generically instantiate the data object. The data object is transferred, at block 312, from the source to the target. Prior to data transfer, the data object or its equivalent may optionally be compressed and/or encrypted, as desired. Depending on the direction of transfer, HQ could be the source or the target, and conversely for each store. At block 314, the target receives the data object and, at block 316, instantiates the appropriate manager object. Finally, at block 318, the manager object that is instantiated at the target is used to persist the received data object to the target's database.

Although the present invention has been described with reference to embodiments, workers skilled in the art will recognize that changes may be made in form and detail without departing from the spirit and scope of the invention. For example, while embodiments of the present invention have generally been described with respect to a pair of complementary objects, other structures such as a struct, dataset, recordset, XML or a binary format could be used as long as a manager class can be associated with the data in order to save the data generically.

What is claimed is:

1. A retail management system for extensibly replicating information, the retail management system comprising:
    a headquarters server application embodied upon a computer storage medium in a computer at a headquarters location, the headquarters server application having a worksheet service that uses a database access layer to read and write data;
    at least one remote application embodied upon a computer storage medium in a computer remote from the headquarters location;
    a communication link between the headquarters server application and at least one remote application;
    a data class, supported by the headquarters server application and the at least one remote application, that encapsulates data about a new entity;
    a manager class, supported by the headquarters server application and the at least one remote application, that manages persistence of the data class;
    wherein the data class and manager class are implemented to replicate the new entity;
    wherein metadata describing the data class is consumed during replication to instantiate a manager class object relative to the new entity; and
    wherein the new entity is replicated over the communication link.

2. The system of claim 1, wherein the headquarters server application is coupled to a service that periodically checks for modification to the new entity.

3. The system of claim 1, and further comprising a change tracking table for recording changes to the new entity.

4. The system of claim 3, wherein the headquarters server application is coupled to a service that periodically checks the change tracking table.

5. The system of claim 3, wherein an entry is added to the change tracking table upon a modification to the new entity.

6. The system of claim 5, wherein entries are added periodically based upon a query for modifications to the new entity.

7. The system of claim 5, and further comprising a software trigger to automatically add the entry to the change tracking table.

8. The system of claim 1, wherein the manager class object includes information to instantiate a data object to encapsulate the new entity.

9. The system of claim 8, wherein the data object is transmitted over the link.

10. The system of claim 1, wherein the link includes web services.

11. The system of claim 1, wherein the new entity is compressed prior to transfer.

12. The system of claim 1, wherein the new entity is encrypted prior to transfer.

13. The system of claim 1, wherein the HQ application is coupled to a user interface that provides data views relative to at least one remote application.

14. The system of claim 13, wherein the interface provides data views of all remote applications in an organization.

15. The system of claim 14, wherein the views allow data to be modified.

16. The system of claim 1, wherein the information is business information, and wherein at least one of the remote locations is located at a store.

17. A method of extensibly replicating data between a source and at least one target located remotely from the source, the method comprising:
    selecting a new entity for replication between the source and the target;
    detecting a modification to the new entity at the source;
    instantiating a manager object at the source relative to the modified new entity;
    instantiating with the manager object a data object to encapsulate the new entity;
    transferring the data object over a link from the source to the target;
    instantiating a manager object at the target relative to the data object received over the link; and
    using the manager object instantiated at the target to persist the data object.

18. The method of claim 17, wherein the target is a headquarters application.

19. The method of claim 18, wherein the target is a store.

20. The method of claim 17, wherein detecting a modification to the new entity includes checking a tracking table.

21. The method of claim 20, wherein an entry is added to the tracking table when the new entity is modified.

22. The method of claim 21, wherein entries are added periodically based upon a query for modifications to the new entity.

23. The method of claim 21, wherein the entry is automatically added.

24. The method of claim 23, wherein automatically adding entries includes employing a database trigger.

25. The method of claim 17, wherein transferring the data object includes employing web services to transfer the data object.

26. The method of claim 17, wherein the data object is compressed prior to the step of transferring.

27. The method of claim 17, wherein the data object is encrypted prior to the step of transferring.

* * * * *